(12) United States Patent
Mun et al.

(10) Patent No.: US 11,841,737 B1
(45) Date of Patent: Dec. 12, 2023

(54) METHOD FOR ERROR DETECTION BY USING TOP-DOWN METHOD

(71) Applicant: ActionPower Corp., Seoul (KR)

(72) Inventors: Hwanbok Mun, Seoul (KR); Sangyoun Paik, Gwangmyeong-si (KR); Subong Choi, Seoul (KR); Dongchan Shin, Seoul (KR); Jihwa Lee, Seoul (KR)

(73) Assignee: ACTIONPOWER CORP., Seoul (KR)

( * ) Notice: Subject to any disclaimer, the term of this patent is extended or adjusted under 35 U.S.C. 154(b) by 0 days.

(21) Appl. No.: 17/970,029

(22) Filed: Oct. 20, 2022

(30) Foreign Application Priority Data

Jun. 28, 2022 (KR) .................. 10-2022-0078808

(51) Int. Cl.
*G06F 40/30* (2020.01)
*G06F 40/205* (2020.01)

(52) U.S. Cl.
CPC ............ *G06F 40/205* (2020.01); *G06F 40/30* (2020.01)

(58) Field of Classification Search
CPC .... G06F 40/211; G06F 40/253; G06F 40/268; G06F 40/284; G06F 40/30; G06N 3/08; G10L 15/00
See application file for complete search history.

(56) References Cited

U.S. PATENT DOCUMENTS

| | | | |
|---|---|---|---|
| 8,953,885 B1* | 2/2015 | Och | G06V 30/268 |
| | | | 382/177 |
| 9,123,333 B2 | 9/2015 | Amarilli et al. | |
| 10,147,428 B1 | 12/2018 | Shastry et al. | |
| 10,388,272 B1* | 8/2019 | Thomson | G10L 15/22 |
| 10,573,312 B1* | 2/2020 | Thomson | G10L 15/22 |
| 11,227,584 B2 | 1/2022 | Iannone et al. | |
| 2017/0148433 A1* | 5/2017 | Catanzaro | G10L 25/18 |
| 2018/0101750 A1* | 4/2018 | Soldevila | G06V 30/18057 |
| 2019/0035415 A1* | 1/2019 | Lu | G10L 21/0364 |
| 2019/0130897 A1* | 5/2019 | Zhou | G06N 7/01 |
| 2020/0043483 A1 | 2/2020 | Prabhavalkar et al. | |
| 2020/0175961 A1* | 6/2020 | Thomson | G10L 15/28 |
| 2020/0193977 A1* | 6/2020 | Ramabhadran | G10L 15/19 |
| 2020/0243094 A1* | 7/2020 | Thomson | G10L 15/32 |

(Continued)

FOREIGN PATENT DOCUMENTS

| | | |
|---|---|---|
| CN | 113571045 A | 6/2021 |
| EP | 2005418 A2 | 12/2008 |
| KR | 10-2187528 B1 | 12/2018 |

OTHER PUBLICATIONS

Lee et al., "A comparison of the performance of noise cancellation methods for improving speech recognition accuracy in noisy environment", *The Korean Society of Electrical Engineers CICS' 20 Information and Control Conference*, Oct. 2020. (3 pages).

(Continued)

*Primary Examiner* — Lamont M Spooner
(74) *Attorney, Agent, or Firm* — Seed IP Law Group LLP

(57) ABSTRACT

Disclosed is a method for error detection, performed by one or more processors of a computing device according to an example embodiment of the present disclosure. The method includes evaluating an error rate for a sentence to be evaluated, in a first language unit. the method includes evaluating an error rate in a second language unit which is smaller than the first language unit, based on the first language unit error.

13 Claims, 6 Drawing Sheets

(56) References Cited

U.S. PATENT DOCUMENTS

| | | | | |
|---|---|---|---|---|
| 2020/0265830 A1* | 8/2020 | Wang | .................... | G06N 3/047 |
| 2020/0402500 A1* | 12/2020 | Zhao | ...................... | G10L 15/02 |
| 2021/0056954 A1 | 2/2021 | Karita et al. | | |
| 2022/0157297 A1* | 5/2022 | Dey | ........................ | G10L 15/22 |
| 2022/0254335 A1* | 8/2022 | Itoh | ........................ | G10L 15/26 |
| 2023/0016637 A1* | 1/2023 | Schmidt | ................ | G06N 3/045 |

OTHER PUBLICATIONS

Blog, AI/Kospeech (Korean STT) "[Python] Korean STT, CER and WER Calculations," https://mingchin.tistory.com/240, Jan. 4, 2022. (8 pages).

Min et al., "A Study on Quantitative Evaluation Method for STT Engine Accuracy based on Korean Characteristics", Journal of the Korea Academia-Industrial cooperation Society, vol. 21, No. 7, pp. 699-707, 2020.

Lee et al., "A comparison of the performance of noise cancellation methods for improving speech recognition accuracy in noisy environment", The Korean Society of Electrical Engineers CICS' 20 Information and Control Conference, pp. 257-258, Oct. 2020.

Korean STT, CER, and WER calculations, https://mingchin.tistory.com/240, Jan. 4, 2022.

\* cited by examiner

| EXISTING METHOD | | | | | | |
|---|---|---|---|---|---|---|
| CORRECT ANSWER | Sometimes looking up at the sky is good for your mental health. | | | | | |
| RESULT A | Some teams cooking up at the sky is good for your mental hells. | | | | | |
| WER | 0.333 | SER | 0.2 | CER | 0.137 | |
| Result B | Some time is looking up hat the ski is goof four you metal healthy. | | | | | |
| WER | 0.83 | SER | 0.33 | CER | 0.1568 | |

| METHOD OF PRESENT DISCLOSURE | | | | | | |
|---|---|---|---|---|---|---|
| CORRECT ANSWER | Sometimes looking up at the sky is good for your mental health. | | | | | |
| RESULT A | Some teams cooking up at the sky is good for your mental hells. | | | | | |
| WER | 0.333 | SER | 0.6 | CER | 0.4 | |
| Result B | Some time is looking up hat the ski is goof four you metal healthy. | | | | | |
| WER | 0.83 | SER | 0.88 | CER | 0.25 | |

*Fig. 7*

METHOD FOR ERROR DETECTION BY USING TOP-DOWN METHOD

CROSS-REFERENCE TO RELATED APPLICATIONS

This application claims priority to and the benefit of Korean Patent Application No. 10-2022-0078808 filed in the Korean Intellectual Property Office on Jun. 28, 2022, the entire contents of which are incorporated herein by reference.

BACKGROUND

Technical Field

The present disclosure relates to a method for error detection by using a top-down method, and more particularly, to a method of improving a qualitative evaluation of error detection using a top-down method.

Description of the Related Art

In many studies including deep learning, an evaluation method is an important means to confirm the performance of the studied content or to be objectively/subjectively compared with the other existing methods.

The evaluation or the evaluation method may be roughly divided into quantitative evaluation and qualitative evaluation. Quantitative evaluation can be said to be objective by measuring and evaluating through indicators such as objective numbers or numerical values. In contrast, qualitative evaluation is a non-numeric evaluation, which can be said to be satisfaction or preference actually felt by a person's sensory organ or psychologically. The qualitative evaluation may have a deviation depending on individual tendencies, so that it can be said to be relatively subjective.

BRIEF SUMMARY

In the result of the voice recognition in the related art, there may be a difference between the quantitative evaluation and the qualitative evaluation and an important issue is to reduce this gap in measuring the performance of the model or the studied method. Further, even in the prediction result sentences having the same word error rate, there may be a big difference in the quantitative evaluation or the qualitative evaluation of different units. For example, the word error rate and the character error rate are quality indicators representing an accuracy of the model, but there is a problem in that this indicator does not match the satisfaction felt by a user who reads the result of the actual voice recognition.

Accordingly, one or more embodiments of the present disclosure provides a method of reducing the difference between the qualitative evaluation actually felt by the user and the quantitative evaluation which is represented by a numerical value and more accurately evaluating the voice recognition result by adding an error rate measuring method in a smaller word unit together with evaluation methods used in the existing voice recognition study.

The present disclosure has been derived based on the various technical problems in the related art including the technical problem identified above. That is, in addition to the technical issues discussed above, the present disclosure may cover various technical issues related to the content to be described below.

The present disclosure has been made to an error to provide a method of improving a qualitative evaluation of error detection using a top-down method.

In the meantime, the technical object to be achieved by the present disclosure is not limited to the technical object mentioned above, and various technical objects may be included within the range apparent to those skilled in the art from the content to be described below.

In order to achieve the above-described objects, an example embodiment of the present disclosure provides a method performed by a computing device. The method may include evaluating an error rate for a sentence to be evaluated, in a first language unit; and evaluating an error rate in a second language unit which is smaller than the first language unit, based on the first language unit error.

As an alternative, the method may further include: evaluating an error rate in a third language unit which is smaller than the second language unit, based on the second language unit error.

As an alternative, the method may further include: calculating a final error rate in consideration of an error rate of the first language unit and an error rate of the second language unit.

As an alternative, the first language unit includes the first language unit includes a word unit and the second language unit includes a character unit or a sub-word unit.

As an alternative, the error rate evaluation result of the first language unit includes a word error rate (WER) evaluation result and the error rate evaluation result of the second language unit includes a character error rate (CER) evaluation result or a sub-word error rate (SER) evaluation result.

As an alternative, the third language unit includes a grapheme unit and the error rate evaluation result of the third language unit includes a grapheme error rate (GER) evaluation result when the second language unit includes the character unit or includes a character error rate (CER) evaluation result when the second language unit includes the sub-word unit.

As an alternative, the error rate evaluation includes at least one of: evaluation of whether substitution occurs, evaluation of whether deletion occurs, and evaluation of whether insertion occurs.

As an alternative, the evaluating of an error rate in a second language unit which is smaller than the first language unit, based on the first language unit error includes: identifying a part where a selected (or in some embodiments, predetermined) type of error occurs in the first language unit; and evaluating an error rate for the part where a selected (or in some embodiments, predetermined) type of error occurs, in the second language unit.

As an alternative, the selected (or in some embodiments, predetermined) type of error includes a substitution error.

As an alternative, the identifying of a part where a selected (or in some embodiments, predetermined) type of error occurs in the first language unit includes: identifying a word in which the substitution error occurs, in the word unit, and the evaluating of an error rate for the part where a selected (or in some embodiments, predetermined) type of error occurs, in the second language unit, includes: evaluating an error rate for the word in which the substitution error occurs, in a character unit or a sub-word unit.

As an alternative, the evaluating of an error rate in a third language unit which is smaller than the second language unit, based on the second language unit error includes: identifying a part where a selected (or in some embodiments, predetermined) type of error occurs in the second language unit; and evaluating an error rate for the part where a selected (or in some embodiments, predetermined) type of error occurs, in the third language unit.

As an alternative, the identifying of a part where a selected (or in some embodiments, predetermined) type of error occurs in the first language unit includes: identifying a character or a sub-word in which the substitution error occurs, in the character unit or the sub-word unit, and the evaluating of an error rate for the part where a selected (or in some embodiments, predetermined) type of error occurs, in the second language unit, includes: evaluating an error rate for the character in which the substitution error occurs, in the grapheme unit when the second language unit includes the character unit; or evaluating an error rate for the sub-word in which the substitution error occurs, in the character unit when the second language unit includes the sub-word unit.

In order to achieve the above-described objects, another example embodiment of the present disclosure provides a computer program stored in a computer readable storage medium. The computer program causes one or more processors to perform operations for detecting an error when the computer program is executed by the one or more processors and the operations include: an operation of evaluating an error rate for a sentence to be evaluated, in a first language unit; and evaluating an error rate in a second language unit which is smaller than the first language unit, based on the first language unit error.

In order to achieve the above-described objects, yet another example embodiment of the present disclosure provides a computing device. The computing device includes: at least one processor; and a memory and the processor is configured to evaluate an error rate for a sentence to be evaluated, in a first language unit and evaluate an error rate in a second language unit which is smaller than the first language unit, based on the first language unit error.

According to the present disclosure, a method for detecting an error may be provided and a method for improving a qualitative evaluation of error detection using a top-down method thereby may also be provided.

BRIEF DESCRIPTION OF THE SEVERAL VIEWS OF THE DRAWINGS

FIG. 7 is a comparison view illustrating a result of performing the error detection and the error rate evaluation using a top-down method according to the example embodiment of the present disclosure and a result of performing the error detection and the error rate evaluation without using a top-down method;

DETAILED DESCRIPTION

Figure 1:
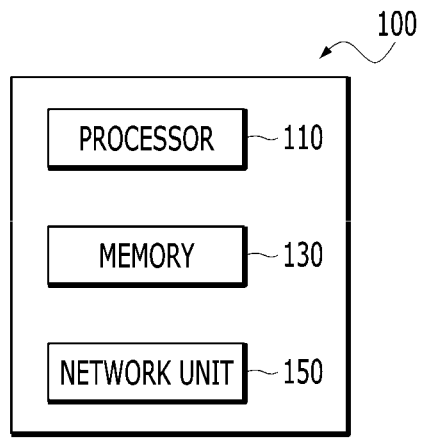
FIG. 1 is a block diagram of a computing device for detecting an error according to an example embodiment of the present disclosure.

Various example embodiments will now be described with reference to drawings. In the present specification, various descriptions are presented to provide appreciation of the present disclosure. However, it is apparent that the example embodiments can be executed without the specific description.

"Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art need to recognize that various illustrative logical blocks, configurations, modules, circuits, means, logic, and algorithm steps described in connection with the example embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented example embodiments is provided so that those skilled in the art of the present disclosure use or implement the present disclosure. Various modifications to the example embodiments will be apparent to those skilled in the art. Generic principles defined herein may be applied to other embodiments without departing from the scope of the present disclosure. Therefore, the present disclosure is not limited to the example embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for detecting an error according to an example embodiment of the present disclosure.

A configuration of the computing device 100 illustrated in FIG. 1 is only an example shown through simplification. In an example embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an example embodiment of the present disclosure. According to an example embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an example embodiment of the present disclosure, processors of a plurality of computing devices may be used together to process the learning of the network function and the data classification using the network function. Further, the computer program executed in the computing device 100 according to an example embodiment of the present disclosure may be a CPU, GPGPU, or TPU executable program.

The processor 110 according to the example embodiment of the present disclosure may perform operations of recognizing an evaluation target sentence to perform the error detection and detecting an error of the evaluation target sentence in first, second, and third language units. The evaluation target sentence is a sentence in which a correct answer exists, and an error is detected by comparing with the correct answer, or a sentence that can be the target of error rate evaluation. At this time, the evaluation target sentence may include a sentence generated by voice recognition and an incomplete sentence in which there is a correct answer. Further, the evaluation target sentence may include various sentences as well as the examples.

According to the example embodiment of the present disclosure, the processor 110 may evaluate an error rate for the evaluation target sentence in the first language unit, evaluate the error rate in a second language unit which is smaller than the first language unit (for example, if the first language unit is a word, the second language unit may be a character or a sub-word) based on the error of the first language unit, and evaluate the error rate in a third language unit which is smaller than the second language unit (for example, if the second language unit is a character, the third language unit may be a phoneme) based on the error of the second language unit.

According to an example embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an example embodiment of the present disclosure may use an arbitrary type known wired/wireless communication systems.

For example, the network unit 150 may receive the evaluation target sentence from the external system. At this time, information received from the database may be data for detecting an error using a top-down method. The evaluation target sentence may include the information of the above-described example, but is not limited to the above-described example, and may be configured in various forms within a range that those skilled in the art understand.

The network unit 150 may transmit and receive information processed by the processor 110, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150. In the meantime, the computing device 100 according to the example embodiment of the present disclosure is a computing system which transmits and receives information with the client, by means of communication and includes a server. At this time, the client may be an arbitrary form of a terminal accessible to the server. For example, the computing device 100 which is a server receives information for detecting an error from the external database to generate an error detection result and an error rate evaluation result and provide a user interface related to the error detection and the error rate evaluation result to the user terminal. At this time, the user terminal outputs the user interface received from the computing device 100 which is a server and receives or processes the information by means of the interaction with the user.

In an additional example embodiment, the computing device 100 may also include any type of terminal that performs additional information processing by receiving a data resource generated in any server.

Figure 2:
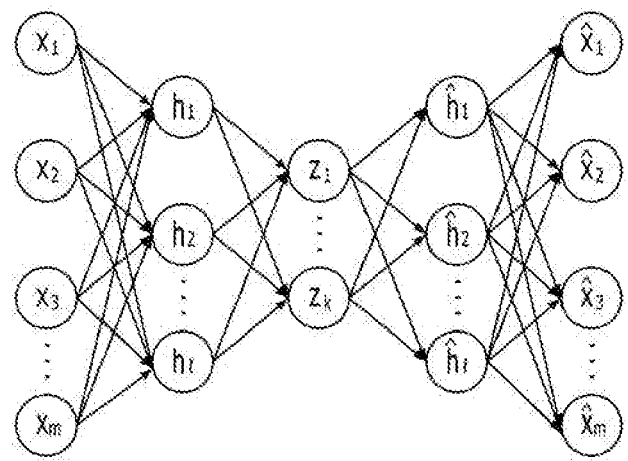
FIG. 2 is a schematic view illustrating a network function according to an example embodiment of the present disclosure.

FIG. 2 is a schematic diagram illustrating a network function according to an example embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a selected (or in some embodiments, predetermined) node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is selected (or in some embodiments, predetermined) for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an example embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another example embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another example embodiment of the present disclosure, the number of nodes of the input layer may be larger than the number of nodes of the output layer, and the neural network may be a neural network of a type in which the number of nodes increases from the input layer to the hidden layer. The neural network according to still yet another example embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an example embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to reduce or minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
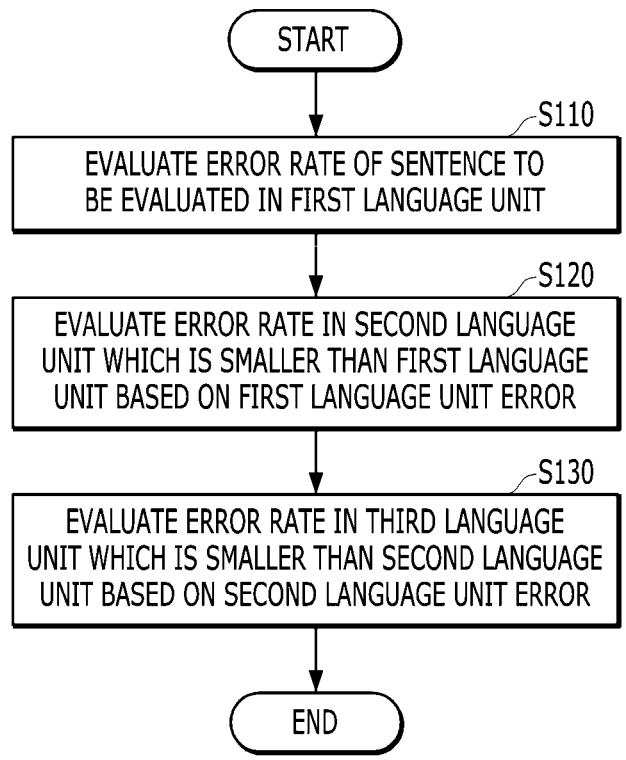
FIG. 3 is a flowchart illustrating a method for detecting an error using a top-down method according to the example embodiment of the present disclosure.

FIG. 3 is a flowchart illustrating a method for detecting an error using a top-down method according to the example embodiment of the present disclosure.

The computing device 100 according to the example embodiment of the present disclosure directly acquires "an evaluation target sentence for performing the error detection and the error rate evaluation using the top-down method" or receives "an evaluation target sentence for performing the error detection and the error rate evaluation using the top-down method" from the external system. The evaluation target sentence is a sentence which becomes a target for detecting an error using a top-down method according to the example embodiment of the present disclosure. The external system may be a server or a database which stores and manages the evaluation target sentences. The computing device 100 may use the evaluation target sentences which are directly acquired or received from the external system as "input data for performing the error detection and the error rate evaluation using the top-down method".

The computing device 100 evaluates an error rate for the evaluation target sentence in the first language unit in step S110. For example, the computing device 100 detects the error for the evaluation target sentence in the first language unit and evaluates an error rate based on the detected error. At this time, the first language unit includes a word unit and the error rate evaluation result of the first language unit may include a word error rate (WER) evaluation result. Further, the error rate evaluation may include at least one of evaluation of whether substitution occurs, evaluation of whether deletion occurs, and evaluation of whether insertion occurs. For example, when whether substitution, deletion, or insertion occurs is evaluated in the word unit, insertion means a letter which is not in an actual correct answer but is erroneously added in the prediction result. For example, a correct answer is presented as "Hello," but the prediction result is presented as "Helloo," "o" may correspond to an insertion error. The substitution means that a spelling of the actual correct answer is different from the spelling of the prediction result. For example, a correct answer is presented as "Hello," but the prediction result is presented as "Hallo," "a" may correspond to a substitution error. Deletion means a letter which is in an actual correct answer, but is not taken down. For example, a correct answer is presented as "Hello," but the prediction result is presented as "ello," "H" may correspond to a deletion error.

A specific process of detecting an error in the first language unit and calculating an error rate of the first language unit will be described below with reference to FIG. 4.

The computing device 100 may evaluate the error rate in a second language unit which is smaller than the first language unit, based on the error of the first language unit detected in step S110. Specifically, the computing device 100 identifies a part where a selected (or in some embodiments, predetermined) type of error is generated in the first language unit and evaluates an error rate of the part where the selected (or in some embodiments, predetermined) type of error is generated in the second language unit. At this time, the second language unit may include a character unit or a sub-word unit and the evaluation result of the error rate of the second language unit may include a character error rate (CER) evaluation result or a sub-word error rate (SER) evaluation result and the selected (or in some embodiments, predetermined) type of error may include the substitution error. For example, the computing device 100 identifies a word in which the substitution error occurs in the unit of words and evaluates an error rate of the word in which the substitution error occurs in the unit of characters. In addition, the computing device 100 identifies a word in which the substitution error occurs in the unit of words and evaluates an error rate of the word in which the substitution error occurs in the unit of sub-words. The specific process of evaluating the error rate in the second language unit which is smaller than the first language unit based on the error of the first language unit will be described below with reference to FIG. 5.

The computing device 100 may evaluate the error rate in a third language unit which is smaller than the second language unit, based on the error of the second language unit detected in step S120. Specifically, the computing device 100 identifies a part where a selected (or in some embodiments, predetermined) type of error is generated in the second language unit and evaluates an error rate of the part where the selected (or in some embodiments, predetermined) type of error is generated in the third language unit. At this time, the third language unit may include a grapheme unit and the evaluation result of the error rate of the third language unit may include a grapheme error rate (GER) evaluation result and a character error rate (CER) evaluation result and the selected (or in some embodiments, predetermined) type of error may include the substitution error. For example, the computing device 100 identifies a character in which the substitution error occurs in the unit of characters and evaluates an error rate of the character in which the substitution error occurs in the unit of graphemes. In addition, the computing device 100 identifies a sub-word in which the substitution error occurs in the unit of sub-words and evaluates an error rate of the sub-word in which the substitution error occurs in the unit of characters. The specific process of evaluating the error rate in the third language unit which is smaller than the second language unit based on the error of the second language unit will be described below with reference to FIG. 6.

However, the language unit to which the proposed disclosure is applied is not limited to the above-described examples and the proposed disclosure may be applied as long as a language unit forms a hierarchy in the sentence to be evaluated. For example, as the first language unit, word or a clause is used and as the second language unit, any one of a sub-word unit (a linguistic unit corresponding to a morpheme), a character unit, and a grapheme unit may be used. That is, the error rate is evaluated for the word or clause unit and the error unit may be evaluated for a part of the word or clause unit in which a selected (or in some embodiments, predetermined) type of error (for example, a substitution error) occurs, as a lower unit.

Figure 4:
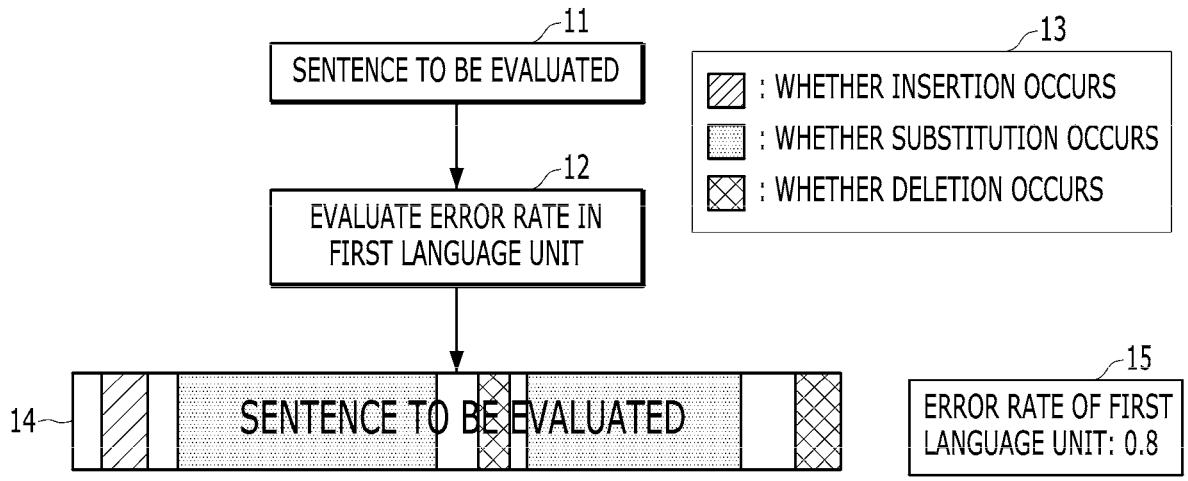
FIG. 4 is a schematic view illustrating a step of detecting an error for an evaluation target sentence in the first language unit and evaluating an error rate of the first language unit, according to an example embodiment of the present disclosure.

FIG. 4 is a schematic view illustrating a step of detecting an error for an evaluation target sentence in the first language unit and evaluating an error rate of the first language unit, according to an example embodiment of the present disclosure.

According to the example embodiment of the present disclosure, the computing device 100 detects an error for the evaluation target sentence 11 in the first language unit and evaluates an error rate (12). Here, the evaluation target sentence 11 is a sentence in which a correct answer exists, and an error is detected by comparing with the correct answer, or a sentence that can be the target of error rate evaluation. At this time, the evaluation target sentence 11 may include a sentence generated by voice recognition and an incomplete sentence in which there is a correct answer. Further, the evaluation target sentence may include various sentences as well as the examples.

When the error rate for the evaluation target sentence 11 is performed in the first language unit, the computing device 100 detects an error depending on whether insertion, substitution, or deletion occurs (13), acquires an error detection result 14 for the evaluation target sentence 11 in the first language unit, and acquires an evaluation result 15 of an error rate in the first language unit based thereon.

The evaluation of the error rate disclosed in the present specification may be calculated by the following Equation 1, for example. However, the evaluation of the error rate is not limited to being calculated by the following Equation, but may be performed by various methods.

$$\text{Error rate} = (\text{Insertion} + \text{Substitution} + \text{Deletion})/N \quad \text{[Equation 1]}$$

In Equation 1, the numerator can be calculated by summing whether insertion, substitution, and deletion occur and the occurrence frequency thereof in a language unit that is a criterion for error rate evaluation. Further, in Equation 1, the denominator means the number of correct language units corresponding to the language units that are the criteria for error rate evaluation. For example, when the word error rate (WER) is evaluated in the word unit, the correct sentence of "오늘은 네가 말한 곳을 갔다가 오후에 약속이 있어서 종로로 가려구" is presented, and the sentence to be evaluated (11) is presented as "오늘 내가 말한 곳에 갔다가 호우에 약속o 있어요 종로로가려고 아니". At this time, the denominator which is substituted in Equation 1 may be calculated as 10, which is the number of correct answers 오늘은 ,"네가 ,"말한 ,"곳을 ,"갔다가 ,"오후에 , ",약속이 ,",있어서 ,",종로로 ," and "가려구" in the word unit. Further, when the error for the word to be evaluated (11) is detected in the word unit, 오늘 ,"내기 , " 곳에 ," 호우에 ," 있어요 ," 종로로 ," and 가려고" are substituted, there is no deleted word as compared with the correct answer, and '아ㄴ" which is not in the correct word is inserted. Accordingly, the numerator substituted in Equation 1 is calculated as 8 which is a result of (insertion: 1+substitution: 7+deletion: 0). As a result, the error rate of the sentence 11 to be evaluated in the word unit may be calculated as 8/10 (=0.8). Korean and word units are only disclosed as examples of the evaluation target sentence and the first language unit, and embodiments according to the present disclosure are not limited to Korean and word units. Foreign languages other than Korean, such as English and Spanish may be included and phrase units, clause units, or sentence units may be included. A process of evaluating an error rate of the second language unit which is smaller than the first language unit, based on the error detection result 14 for the sentence 11 to be evaluated in the first language unit will be described in more detail with reference to FIG. 5.

Figure 5:
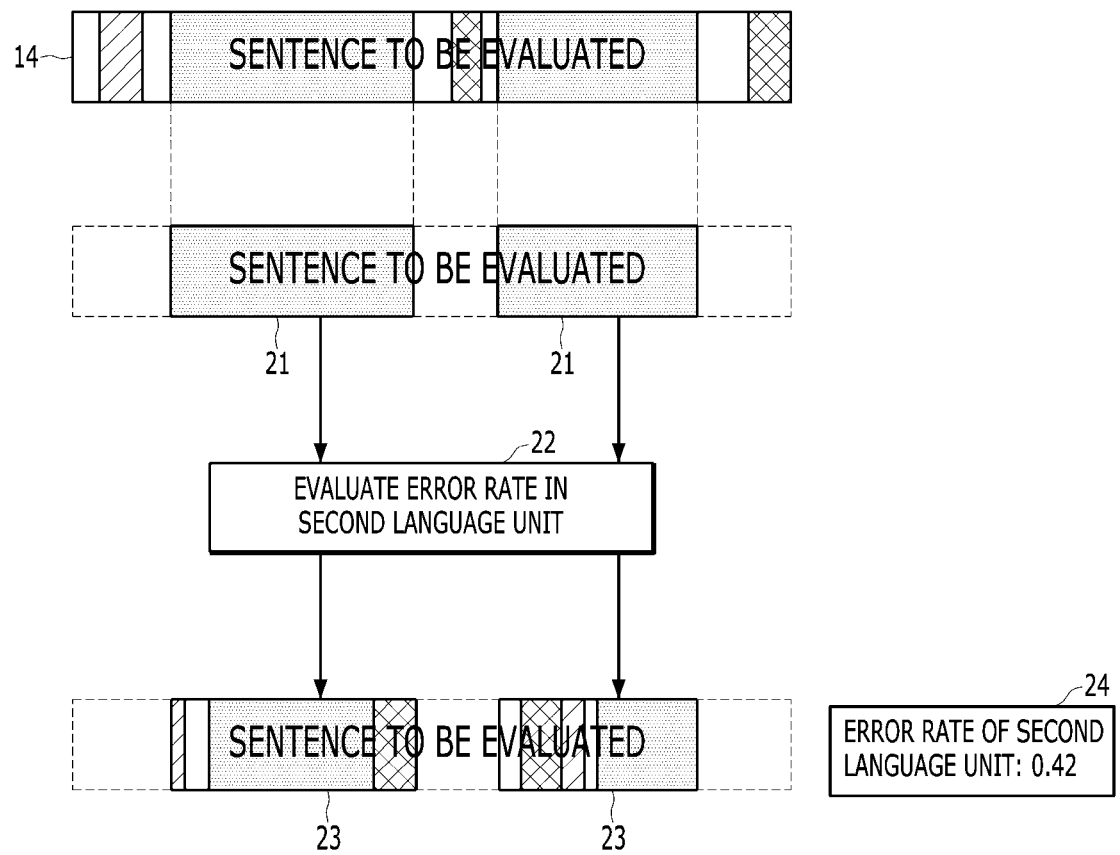
FIG. 5 is a schematic view illustrating a step of detecting an error in a second language unit smaller than a first language unit based on an error of a first language unit and evaluating an error rate in a second language unit according to an example embodiment of the present disclosure.

FIG. 5 is a schematic view illustrating a step of detecting an error in a second language unit smaller than a first language unit based on an error of a first language unit and evaluating an error rate in a second language unit, according to an example embodiment of the present disclosure.

According to the example embodiment of the present disclosure, the computing device 100 detects an error in the second language unit which is smaller than the first language unit based on the error detection result 14 of the first language unit and evaluates the error rate (22). At this time, when the first language unit is a "word," the second language unit may include a letter or a character or a sub-word which is a language unit smaller than the word. Further, as the examples of the first language unit and the second language unit which is smaller than the first language unit, the word and the character are disclosed, but the example embodiments according to the present disclosure are not limited to the word and the character. For example, if the first language unit is a higher level than the second language unit, the method of the present disclosure may be applied.

The computing device 100 identifies a part 21 where a selected (or in some embodiments, predetermined) type of error occurs from the error detection result 14 of the first language unit and evaluates the error rate for the part 21 where the selected (or in some embodiments, predetermined) type of error occurs in the second language unit (22). At this time, the selected (or in some embodiments, predetermined) type of error may include a substitution error. When the error rate for the part 21 where the substitution error of the first language unit is detected is evaluated in the second language unit, the computing device 100 acquires an error detection result 23 for the part 21 where the substitution error of the first language unit is detected, in the second language unit and acquires an evaluation result 24 of the error rate of the second language unit based thereon. When the character error rate CER for the "part 21 where the substitution error occurs in the error detection result 14 of the word unit is evaluated, as the part 21 where the substitution error in the word unit occurs, (오늘), (내가), (곳에), (호우에), (있어요), (종로로로), (가려고) are presented and as corresponding correct words, (오늘은), (네가), (곳을), (오후에), (있어서), (종로로), (가려구) are presented. At this time, in order to perform the error rate evaluation in the character unit, the denominator which is substituted in Equation 1 may be calculated as 19, which is the number of correct answers in the character unit, (오), (늘), (은), (네), (가), (곳), (을), (오), (후), (에), (있), (어), (서), (종), (로), (로), (가), (려), (구). Further, when the error detection in the character unit for the part 21 in which the substitution error of the word unit occurs is performed, the substitutions of (내), (에), (후), (우), (요), or (고) occur, (은) is deleted as compared with the correct characters, and (로) which is not in the correct characters is inserted. Accordingly, the numerator substituted in Equation 1 is calculated as 8 which is a result of (insertion: 1+substitution: 6+deletion: 1). As a result, the character error rate for the part 21 where the substitution error in the word unit occurs may be calculated as 8/19 (=0.42).

Figure 6:
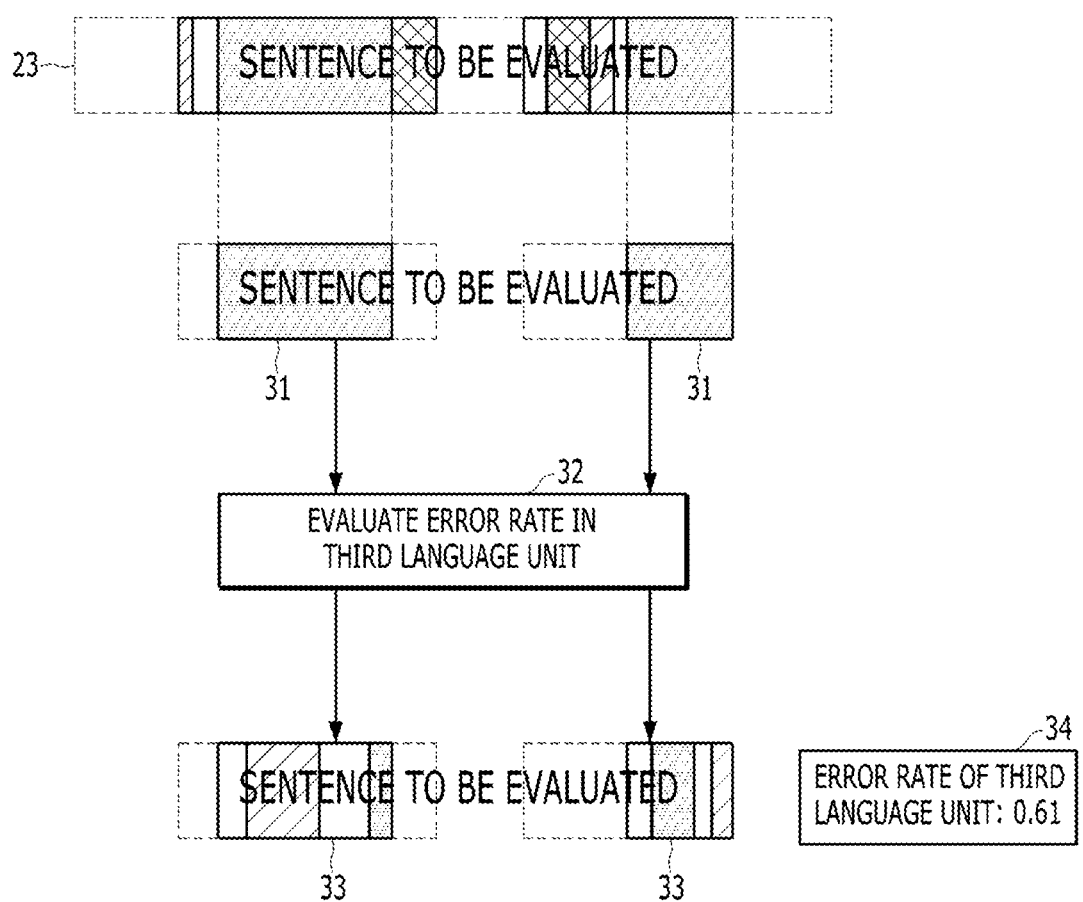
FIG. 6 is a schematic view illustrating a step of detecting an error in a third language unit smaller than a second language unit based on an error of a second language unit and evaluating an error rate in a third language unit according to an example embodiment of the present disclosure.

Next, a process of detecting an error in the third language unit based on the error of the second language unit will be disclosed in more detail with reference to FIG. 6.

FIG. 6 is a schematic view illustrating a step of detecting an error in a third language unit smaller than a second language unit based on an error of a second language unit and evaluating an error rate in a third language unit according to an example embodiment of the present disclosure.

According to the example embodiment of the present disclosure, the computing device 100 detects an error in the third language unit which is smaller than the second language unit based on the error detection result 23 of the second language unit and evaluates the error rate (32). At this time, when the second language unit is a character, the third language unit may include a grapheme which is a language unit smaller than the character. Further, as the examples of the second language unit and the third language unit which is smaller than the second language unit, the character and the grapheme are disclosed, but the example embodiments according to the present disclosure are not limited to the character and the grapheme. For example, if the second language unit is a higher level than the third language unit, the method of the present disclosure may be applied.

Specifically, the computing device 100 identifies a part 31 where a selected (or in some embodiments, predetermined) type of error occurs from the error detection result 23 of the second language unit and evaluates the error rate for the "part 31 where the selected (or in some embodiments, predetermined) type of error of the second language unit occurs" in the third language unit (32). At this time, the selected (or in some embodiments, predetermined) type of error may include a substitution error. When the error rate for the part 31 where the substitution error of the second language unit is detected is evaluated in the third language unit, the computing device 100 acquires an error detection result 33 for the part 31 where the substitution error of the second language unit is detected, in the third language unit and acquires an evaluation result 34 of the error rate of the third language unit based thereon.

For example, when the character error rate CER for the "part 21 where the substitution error occurs in the error detection result 14 of the word unit is evaluated, as the parts 31 where the substitution error in the character unit occurs, (내), (에), (호), (우), (요) (고) are presented, and as corresponding correct words, (너), (을), (오), (후), (서), (구), are presented. At this time, in order to perform the error rate evaluation in the grapheme unit, the denominator which is substituted in Equation 1 may be calculated as 13, which is the number of correct answers in the grapheme unit, (ㄴ), (ㅔ), (ㅇ), (ㅡ), (ㄹ), (ㅇ), (ㅗ), (ㅎ), (ㅜ), (ㅅ), (ㅓ), (ㄱ), (ㅜ). Further, when the error detection in the grapheme unit for the part 31 in which the substitution error of the character unit occurs is performed, the substitutions of (ㅐ), (ㅔ), (ㅎ), (ㅇ), (ㅇ), (ㅔ), or (ㅗ) occur, (ㄹ) is deleted as compared with the correct character, and there is no inserted grapheme as compared with the correct character. Accordingly, the numerator substituted in Equation 1 is calculated as 8 which is a result of (insertion: 0+substitution: 7+deletion: 1). As a result, the grapheme error rate for the part 31 where the substitution error in the character unit occurs may be calculated as 8/13 (=0.61).

A process of comparing a result obtained by performing the error detection and the error rate evaluation using the top-down method and a result obtained by performing the error detection and the error rate evaluation without using the top-down method will be disclosed in more detail with reference to FIG. 7.

FIG. 7 is a comparison view illustrating a result of performing the error detection and the error rate evaluation using a top-down method according to the example embodiment of the present disclosure and a result of performing the error detection and the error rate evaluation without using a top-down method.

According to the example embodiment of the present disclosure, the computing device 100 may calculate a final error rate in consideration of an error rate of the first language unit and an error rate of the second language unit. For example, even though two sentences for the correct sentence have the same WER and CER, the actual qualitative evaluation may show markedly different results.

The results A (42) and B (43) obtained by performing (41) the error detection and the error rate evaluation without using a top-down method and the results A (52) and B (53) obtained by performing (51) the error detection and the error rate evaluation using a top-down method according to the example embodiment of the present disclosure are disclosed. For example, even though as a result of performing the error rate evaluation depending on whether the top-down method is used, two sentences have the same WER and CER, the actual qualitative evaluation may show markedly different results. Specifically, referring to FIG. 7, as the result 41 of performing (41) the existing method, when A (42) and B (43) are compared, the result A (42) has WER of 0.33 and CER of which are better than or similar to the result B (43). However, when the existing method is performed (41), even though in the semantic accuracy that the user actually feels, the result B (43), between the results A (42) and B (43), is closer to the correct answer, there is a discrepancy in which the WER and CER of the result A (42) are lower than those of the result B. In contrast, when the results A (52) and B (53) obtained by performing (51) the error detection and the error rate evaluation by the method of the present disclosure are compared, the CER of the result B (53) are lower than those of the result A so that the result matching the actual user's experience may be derived. The result WER of the performing (51) the error detection and the error rate evaluation by means of the method of the present disclosure is the same for the results A (42) and B (43), but CER and SER (sub-word error rate) are applied to the part in which the substitution error occurs so that excluding the insertion error and the deletion error, the voice recognition is substantially performed to analyze the predicted sub-words and characters in more detail. Further, the pronunciation is performed in the character unit so that it is considered that the result of the low CER has a high pronunciation similarity to the actual correct answer. Further, according to the present disclosure, not only the WER and the SER as in the related art, but also the CER is considered, to consider the error rate in more detail. The error rate is considered in first language unit, the second language unit by the top-down method so that the error rate of the third language unit is selectively calculated only for the "text which has a selected (or in some embodiments, predetermined) type of error and needs to be reviewed" (for example, deletion and insertion are not considered) so that a technical effect of saving a resource may be obtained.

According to the method of the present disclosure which has been described with reference to FIG. 7, the error rate has been evaluated by dividing the sentence into three hierarchies, but it is not limited thereto and the method of the present disclosure is also applied to evaluation of the error rate by dividing the sentence to be evaluated into a plurality of hierarchies. For example, the sentence to be evaluated may be divided into only two hierarchies of the word unit and the character unit to evaluate the error rate. As another example, the sentence to be evaluated is divided into four hierarchies of a word unit, a subword unit, a character unit, and a grapheme unit to evaluate the error rate.

Further, the final error rate may be calculated by comprehensively considering the error rates derived in a plurality of units. For example, in the example embodiment which has been described with reference to FIG. 7, an appropriate weight is set for each of the word error rate WER, the sub-word error rate SER, and the character error rate CER and the weight corresponding to each error rate is multiplied and then summed together to calculate a final error rate.

Disclosed is a computer readable medium storing the data structure according to an example embodiment of the present disclosure. The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning. Hereinafter, the computation model, the neural network, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include selected (or in some embodiments, predetermined) components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include selected (or in some embodiments, predetermined) other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 8:
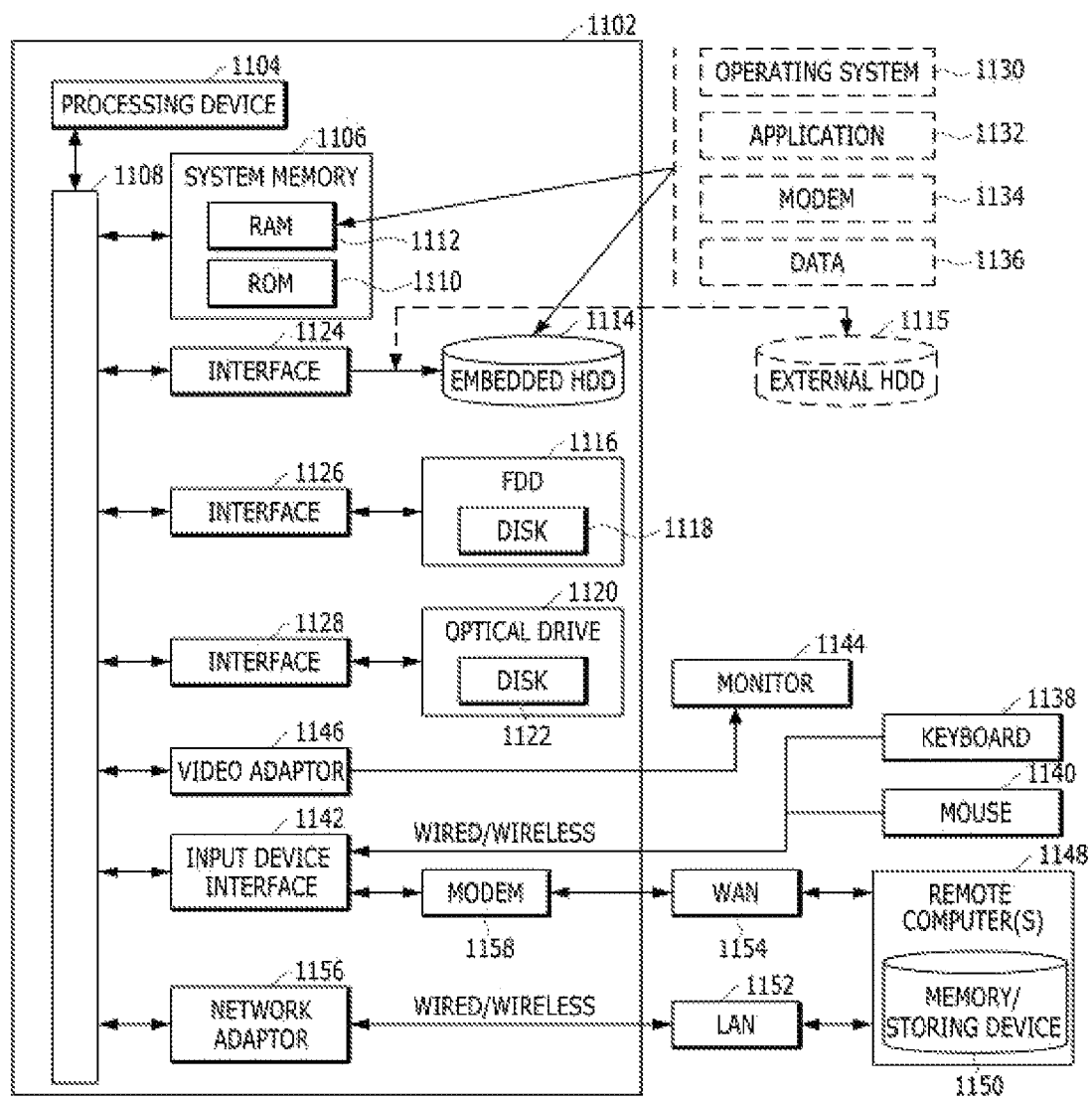
FIG. 8 illustrates a simple and general schematic view of an example computing environment in which example embodiments of the present disclosure are embodied.

FIG. 8 is a normal and schematic view of an example computing environment in which the example embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The example embodiments described in the present disclosure may also be implemented in a distributed computing environment in which selected (or in some embodiments, predetermined) tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a selected (or in some embodiments, predetermined) method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or selected (or in some embodiments, predetermined) other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An example environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a selected (or in some embodiments, predetermined) processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of selected (or in some embodiments, predetermined) data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an example operating environment and further, the selected (or in some embodiments, predetermined) media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is example and other means configuring a communication link among computers may be used.

The computer 1102 performs an operation of communicating with selected (or in some embodiments, predetermined) wireless devices or entities which are disposed and operated by the wireless communication, for example, the printer, a scanner, a desktop and/or a portable computer, a portable data assistant (PDA), a communication satellite, selected (or in some embodiments, predetermined) equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different selected (or in some embodiments, predetermined) technologies and techniques. For example, data, instructions, commands, information, signals, bits, symbols, and chips which may be referred in the above description may be expressed by voltages, currents, electromagnetic waves, magnetic fields or particles, optical fields or particles, or selected (or in some embodiments, predetermined) combinations thereof.

It may be appreciated by those skilled in the art that various example logical blocks, modules, processors, means, circuits, and algorithm steps described in association with the example embodiments disclosed herein may be implemented by electronic hardware, various types of programs or design codes (for easy description, herein, designated as software), or a combination of all of them. In order to clearly describe the intercompatibility of the hardware and the software, various example components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various example embodiments presented herein may be implemented as manufactured articles using a method, a device, or a standard programming and/or engineering technique. The term manufactured article includes a computer program, a carrier, or a medium which is accessible by a selected (or in some embodiments, predetermined) computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of example accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented example embodiments is provided so that those skilled in the art of the present disclosure use or implement the present disclosure. Various modifications of the example embodiments will be apparent to those skilled in the art and general principles defined herein can be applied to other example embodiments without departing from the scope of the present disclosure. Therefore, the present disclosure is not limited to the example embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for error detection performed by a computing device, comprising:
    evaluating an error rate for a sentence to be evaluated, in a first language unit;
    identifying a part where a predetermined type of error occurs in the first language unit; and
    evaluating an error rate for the part where a predetermined type of error occurs, in a second language unit which is smaller than the first language unit.

2. The method according to claim 1, further comprising:
    evaluating an error rate in a third language unit which is smaller than the second language unit, based on the second language unit error.

3. The method according to claim 2, wherein the third language unit includes a grapheme unit and the error rate evaluation result of the third language unit includes a grapheme error rate (GER) evaluation result when the second language unit includes the character unit or includes a character error rate (CER) evaluation result when the second language unit includes the sub-word unit.

4. The method according to claim 2, wherein the evaluating of an error rate in a third language unit which is smaller than the second language unit, based on the second language unit error includes:
    identifying a part where a predetermined type of error occurs in the second language unit; and
    evaluating an error rate for the part where a predetermined type of error occurs, in the third language unit.

5. The method according to claim 4, wherein the identifying of a part where a predetermined type of error occurs in the second language unit includes:
    identifying a character or a sub-word in which the substitution error occurs, in the character unit or the sub-word unit, and
    the evaluating of an error rate for the part where a predetermined type of error occurs, in the third language unit, includes:
    evaluating an error rate for the character in which the substitution error occurs, in the grapheme unit when the second language unit includes the character unit; or
    evaluating an error rate for the sub-word in which the substitution error occurs, in the character unit when the second language unit includes the sub-word unit.

6. The method according to claim 1, wherein the first language unit includes a word unit and the second language unit includes a character unit or a sub-word unit.

7. The method according to claim 1, wherein the error rate evaluation result of the first language unit includes a word error rate (WER) evaluation result and the error rate evaluation result of the second language unit includes a character error rate (CER) evaluation result or a sub-word error rate (SER) evaluation result.

8. The method according to claim 1 or 2, wherein the error rate evaluation includes at least one of:
    evaluation of whether substitution occurs,
    evaluation of whether deletion occurs, and
    evaluation of whether insertion occurs.

9. The method according to claim 1, wherein the predetermined type of error includes a substitution error.

10. The method according to claim 1, wherein the identifying of a part where a predetermined type of error occurs in the first language unit includes:
    identifying a word in which the substitution error occurs, in the word unit, and
    the evaluating of an error rate for the part where a predetermined type of error occurs, in the second language unit, includes:
    evaluating an error rate for the word in which the substitution error occurs, in a character unit or a sub-word unit.

11. The method according to claim 1, further comprising:
    calculating a final error rate in consideration of an error rate of the first language unit and an error rate of the second language unit.

12. A computer program stored in a computer readable storage medium which causes one or more processors to perform operations for detecting an error when the computer program is executed by the one or more processors, wherein the operations include:
    an operation of evaluating an error rate for a sentence to be evaluated, in a first language unit:
    an operation of identifying a part where a predetermined type of error occurs in the first language unit; and
    an operation of evaluating an error rate for the part where a predetermined type of error occurs, in a second language unit which is smaller than the first language unit.

13. A computing device, comprising:
    at least one processor; and
    a memory,
    wherein at least one processor is configured to evaluate an error rate for a sentence to be evaluated, in a first language unit
    identify a part where a predetermined type of error occurs in the first language unit; and
    evaluate an error rate for the part where a predetermined type of error occurs, in a second language unit which is smaller than the first language unit.

* * * * *